United States Patent
Thakkalapelli et al.

(10) Patent No.: US 11,379,440 B1
(45) Date of Patent: Jul. 5, 2022

(54) CORRECTION, SYNCHRONIZATION, AND MIGRATION OF DATABASES

(71) Applicant: Bank of America Corporation, Charlotte, NC (US)

(72) Inventors: Damodarrao Thakkalapelli, Agoura Hills, CA (US); Rama Venkata S. Kavali, Frisco, TX (US); Venugopala Rao Randhi, Hyderabad (IN); Ravindra Dabbiru, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/149,331

(22) Filed: Jan. 14, 2021

(51) Int. Cl.
*G06F 16/00* (2019.01)
*G06F 16/21* (2019.01)
*G06F 16/28* (2019.01)
*G06F 16/27* (2019.01)
*G06F 16/215* (2019.01)
*G06F 11/34* (2006.01)

(52) U.S. Cl.
CPC .......... *G06F 16/214* (2019.01); *G06F 16/215* (2019.01); *G06F 16/217* (2019.01); *G06F 16/27* (2019.01); *G06F 16/284* (2019.01); *G06F 11/3452* (2013.01)

(58) Field of Classification Search
CPC .... G06F 16/214; G06F 16/215; G06F 16/217; G06F 16/27; G06F 16/284; G06F 11/3452
See application file for complete search history.

(56) References Cited

U.S. PATENT DOCUMENTS

| | | | |
|---|---|---|---|
| 7,065,541 B2 | 6/2006 | Gupta et al. | |
| 9,071,623 B2* | 6/2015 | Arthursson | ............. G06F 9/455 |
| 10,467,219 B2 | 11/2019 | Dahbour et al. | |
| 2005/0289147 A1* | 12/2005 | Kahn | .................... G06F 16/972 |
| 2007/0185938 A1 | 8/2007 | Prahlad et al. | |
| 2009/0083338 A1* | 3/2009 | Evans | .................... G06F 16/168 |
| 2014/0181021 A1* | 6/2014 | Montulli | ............... G06F 16/137 707/624 |
| 2016/0253339 A1* | 9/2016 | Ambrose | .............. G06F 16/113 707/693 |
| 2017/0329677 A1* | 11/2017 | Crofton | ............... G06F 16/2455 |
| 2020/0097485 A1 | 3/2020 | Siegel et al. | |
| 2020/0192578 A1 | 6/2020 | Sinha | |

* cited by examiner

*Primary Examiner* — Diedra McQuitery
(74) *Attorney, Agent, or Firm* — Banner & Witcoff, Ltd.

(57) ABSTRACT

Aspects of the disclosure relate to management of databases in different server environments. In particular, various aspects of this disclosure relate to correction, synchronization, and/or migration of databases between different database servers. A feed file that is rejected from loading in a database associated with a source server may prioritized in a destination server. A feed file hierarchy of the rejected feed file may be determined and the destination server may process loading of the rejected feed file to a database based on the determine feed file hierarchy. Any corrections applied at the destination server may also be applied at the source server.

20 Claims, 13 Drawing Sheets

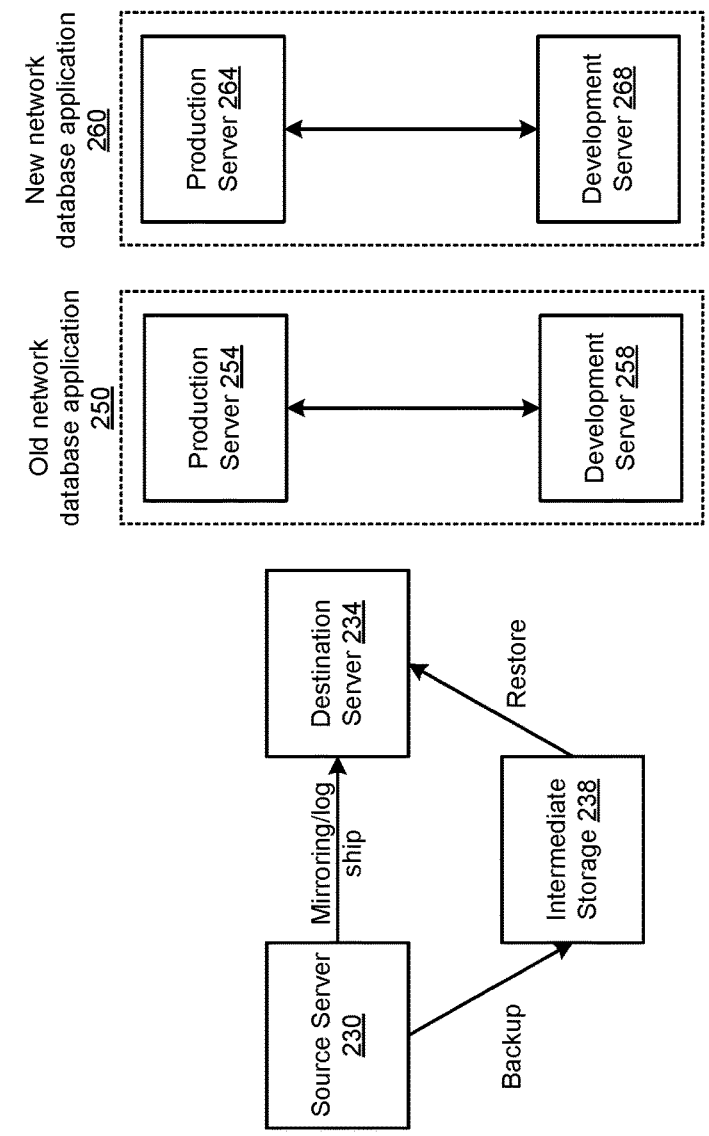
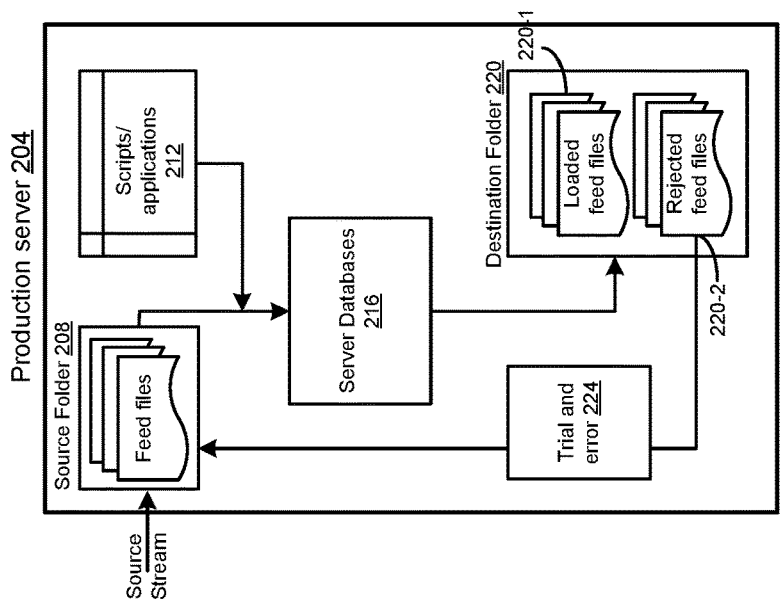
FIG. 2C
FIG. 2B
FIG. 2A

CORRECTION, SYNCHRONIZATION, AND MIGRATION OF DATABASES

FIELD

Aspects described herein generally relate to databases maintained in servers, and more specifically to synchronization, migration, and correction of such databases.

BACKGROUND

Enterprise organizations may maintain data in the form of databases in database servers. For example, an enterprise organization may use databases for maintaining user or client information associated with portals or applications used to service various operations. Server systems may use a network database application to define, create, maintain, and control access to a database. A network database application may be used to define a server, where the server may then be used to service various requests (e.g., query requests, edit requests, etc.) associated with a corresponding database. The network database application may correspond to a relational database management system (RDBMS).

Databases are generally associated with a database environment (e.g., production environment, development environment, etc.), with each environment having a different purpose. A development environment may be used for developing, testing, and troubleshooting, while a production environment may be used for servicing an end user. Various operations may be performed on the databases. For example, databases may be migrated from one server corresponding a first environment to another server corresponding to a second environment. Databases may be copied from a server corresponding to a higher level environment (e.g., a production environment) to a server corresponding to lower level environment (e.g., a development environment).

SUMMARY

Aspects of the disclosure provide efficient and flexible technical solutions that address and overcome problems associated with databases maintained by server systems. In particular, one or more aspects of the disclosure relate to synchronization, migration, and correction of databases in an efficient and cost-effective manner.

In accordance with one or more arrangements, a computing platform having at least one processor, a communication interface, and memory may configure the source server with a first source folder and a first destination folder, and configure the destination server with a second source folder and a second destination folder. The computing platform may receive one or more feed files at the first source folder. The computing platform may attempt to load the one or more feed files at the first source folder to a database associated with the source server, and move the one or more feed files to the first destination folder. The computing platform may determine presence of the one or more feed files in the first destination folder and copy the one or more feed files to the second source folder. The computing platform may determine that a feed file of the one or more feed file was rejected from loading to the database associated with the source server. Based on determining that the feed file of the one or more feed file was rejected from loading to the database associated with the source server, the computing platform may determine a parent feed file associated with the feed file. The computing platform may load the parent feed file to a database associated with the destination server, and after loading the parent feed file to the database associated with the destination server, load the feed file to the database associated with the destination server.

In some arrangements, the computing platform, after loading the feed file to the database associated with the destination server, may load the parent feed file to the database associated with the source server. Further, the computing platform, after loading the parent feed file to the database associated with the source server, may load the feed file to the database associated with the source server.

In some arrangements, the computing platform may determine a query history in a measurement time interval, associated with the feed file, at the source server. The query history may correspond to at least one of: a frequency at which the feed file is queried in the measurement time interval at the source server; a number of times the feed file is queried in the measurement time interval at the source server; or a number of users who queried the feed file in the measurement time interval at the source server. The computing platform may purge the feed file at the database associated with the destination server if the feed file is not queried in the measurement time interval. The computing platform may compress the feed file at the database associated with the destination server if the feed file is read but not modified in the measurement time interval.

In some arrangements, the computing platform may determine the parent feed file by determining the parent feed file based on an indication in the feed file.

In some arrangements, the computing platform may determine a job account used to copy the one or more feed files to the second source folder, and determine one or more scripts based on the job account. Then, the computing platform may load the parent feed file and the feed file to the database associated with the destination server by causing loading the parent feed file and the feed file based on the one or more scripts. The one or more scripts may be associated with an individual user if the job account is an account associated with the individual user. The one or more scripts may be associated with the source server if the job account is a service account. The one or more scripts may indicate one or more tables in the database associated with the destination server to which the feed file and the parent feed file are loaded.

In some arrangements, the feed file may be associated with a key columns file indicating one or more columns of the feed file. The computing platform may load the feed file to the database associated with the destination server by loading the one or more columns of the feed file and not loading other columns of the feed file.

In some arrangements, the computing platform may abort loading other feed files, of the one or more feed files, different from the feed file. The computing platform may load the other feed files after loading the feed file.

In some arrangements, the source server may be a production server and the destination server may be a development server. In some arrangements, the source server and the destination server may be associated with a same network database application. In some arrangements, the source server and the destination server may be associated with different network database applications.

In some arrangements, the feed file may comprise an indication of the parent feed file. The computing platform determine the parent feed file based on the indication.

In accordance with one or more arrangements, a computing platform having at least one processor, a communication interface, and memory may configure the source server with a first source folder and a first destination folder and configure the destination server with a second source folder and a second destination folder. The computing platform may receive a plurality of feed files at the first source folder and load the plurality of feed files at the first source folder to a database associated with the source server. The computing platform may move the plurality of feed files to the first destination folder and copy a feed file, of the plurality of feed files, to the second source. The computing platform may load the feed file to a database associated with the destination server. The computing platform may determine one or more first performance statistics associated with the feed file at the destination server and send an indication of the one or more first performance statistics to a user computing device.

In some arrangements, the computing platform may determine one or more second performance statistics associated with the feed file at the source server. In some arrangements, the computing platform may send an indication of the one or more second performance statistics to a user computing device.

In some arrangements, the one or more first performance statistics may comprise one or more of: memory resources required for the feed file loaded at the destination server, or a latency associated with the feed file loaded at the destination server.

In some arrangements, the computing platform, after loading the feed file to the database associated with the destination server, may copy a second feed file, of the plurality of feed files, to the second source folder. The computing platform may then load the second feed file to the database associated with the destination server.

In some arrangements, the loading the feed file to the database associated with the destination server may be based on receiving a first instruction from the user computing device. The loading the second feed file to the database associated with the destination server may be based on receiving a second instruction from the user computing device.

In some arrangements, the source server and the destination server may be associated with different relational database management systems (RDBMSs). In some arrangements, the source server and the destination server may be associated with different versions of a same relational database management system (RDBMS).

In some arrangements, the computing platform may determine a job account used to copy the feed file to the second source folder and may determine one or more scripts based on the job account. The computing platform may load the feed file to the database associated with the destination server by loading the feed file based on the one or more scripts. The one or more scripts may be associated with an individual user if the job account is an account associated with the individual user. The one or more scripts may be associated with the source server if the job account is a service account. The one or more scripts may indicate a table in the database to which the feed file is loaded.

In some arrangements, the feed file may be associated with a key columns file indicating one or more columns of the feed file. The computing platform may load the feed file to the database associated with the destination server by loading the one or more columns of the feed file and not loading other columns of the feed file.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C show traditional techniques associated with database management in servers, in accordance with one or more example arrangements;

DETAILED DESCRIPTION

Figure 1A:
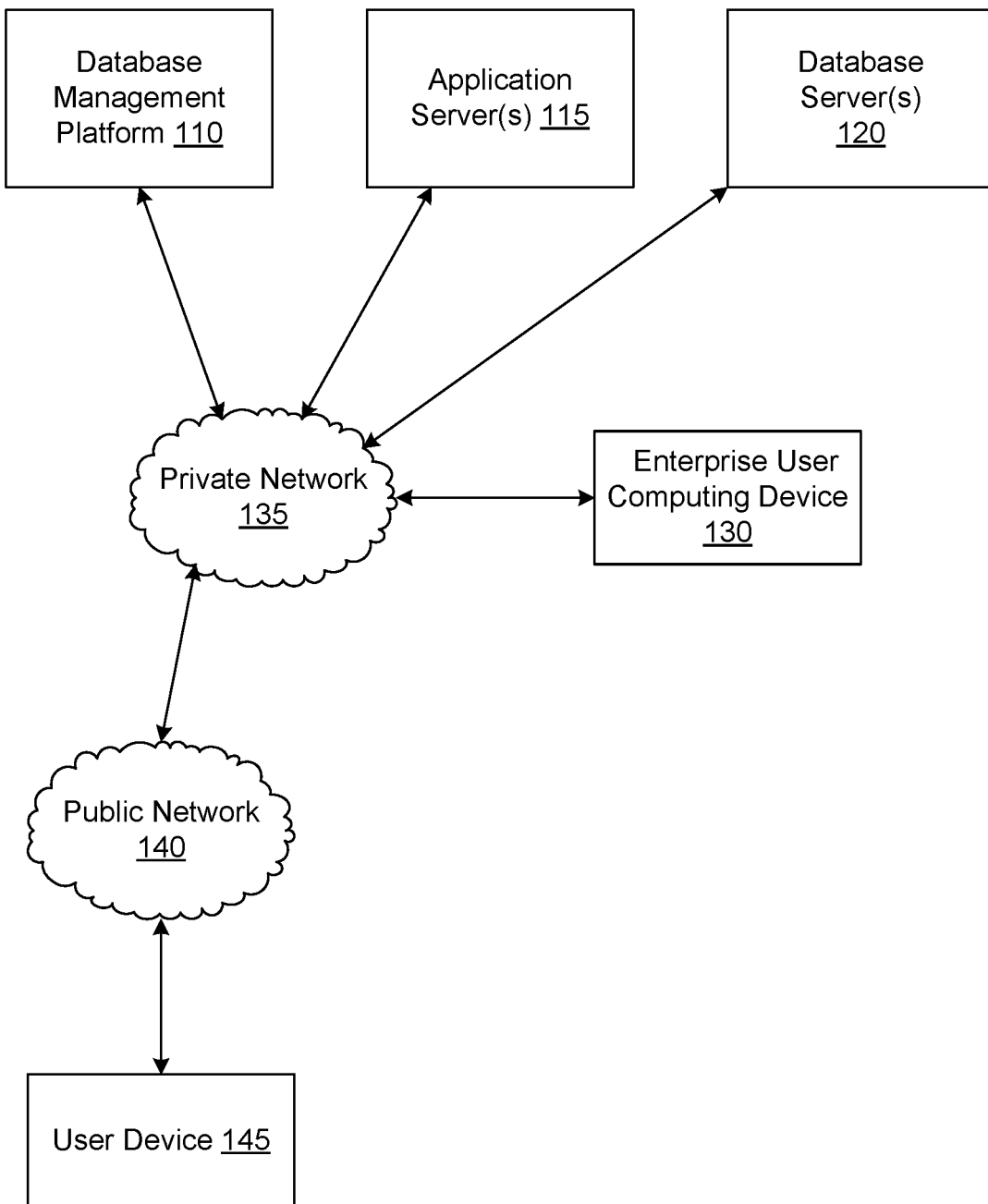
FIGS. 1A and 1B show an illustrative computing environment 100 for database management, in accordance with one or more example arrangements.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

An enterprise organization may use database servers to provide other computing devices in a network with services related to accessing and retrieving data from databases. For example, the enterprise organization may use databases to store customer/client data, which may then be retrieved by applications and/or users. A network database application may be used to maintain database servers. Various operations may be performed on these databases including, but not limited to, migrating databases between servers, fixing errors in databases, synchronizing data between different servers, etc. The operations may involve servers corresponding to different database environments (e.g., production environment, development environment, etc.).

Operations involving servers corresponding to different database environments may have many inefficiencies. For example, synchronizing data between servers corresponding to heterogenous environments may comprise synchronizing data from a source server corresponding to a higher level environment (e.g., a production server) to a destination server corresponding to a lower level environment (e.g., a development server). The destination server may have fewer resources (e.g., memory) than the source server. As a result, directly copying a database from the higher level environment into the lower level environment may not necessarily be possible. Traditional techniques for synchronization (e.g., mirroring/log shipping, backup/restore) may be resource inefficient, may result in performance degradation, and/or may not be applicable for migration between servers corresponding to heterogenous environments. For example, log shipping may require both source and destination servers to be always online and may further require source server resources. This may cause latency in completion of other jobs at the source server. Backup/restore may be inefficient with respect to the memory required and may require the destination server to have same storage capacity at the destination server and the source server.

Existing techniques also do not enable real-time synchronization between different servers. For example, databases in a production server may not be efficiently synchronized with a development server for development and testing purposes. In absence of databases being real-time synchronized to development servers, any errors in production server may perpetuate in the production server or may need to be corrected using inefficient trial and error techniques.

Migrating databases between servers corresponding to different network database applications may be a resource intensive process, both in terms of manpower, time, and computing resources. During the migration process, an enterprise organization may need to parallelly maintain production and development servers for each of the network database applications. Using parallel servers may result in inefficiencies for the enterprise organization. For example, monitoring may need to be done parallelly in both the existing servers and the new servers (e.g., for performance validation of databases migrated to new servers). Further, development processes may need to be completed in the previous server prior to migration of databases to the new server. Separate teams may need to be maintained for each of the servers while the migration is underway and for determining whether the migration to the new servers is successful and beneficial. Further, it may only be possible to determine the performance of the databases in the new server once all the databases have been migrated to the new server.

Various examples described herein enable streamlined operations involving multiple servers. A file watcher daemon may be used to synchronize and migrate data from a source server to a destination server. Synchronization and/or migration may comprise copying specific portion of a feed file (e.g., columns, priority data) to the destination server. Further, any corrections necessary in data in the feed files may be performed at a destination server and may be shared with a source server, thereby avoiding trial and error correction at the source server. Synchronization and/or migration may be performed without using source server resources and may be performed in real time. The use of file watcher daemon may enable migration by copying feed files from the source server to the destination server in an incremental manner. Development and testing may also be done in an incremental manner enabling reduced use of resources. Incremental development and testing may also enable the enterprise organization to determine whether migration to the destination server is advisable or not.

Figure 1B:
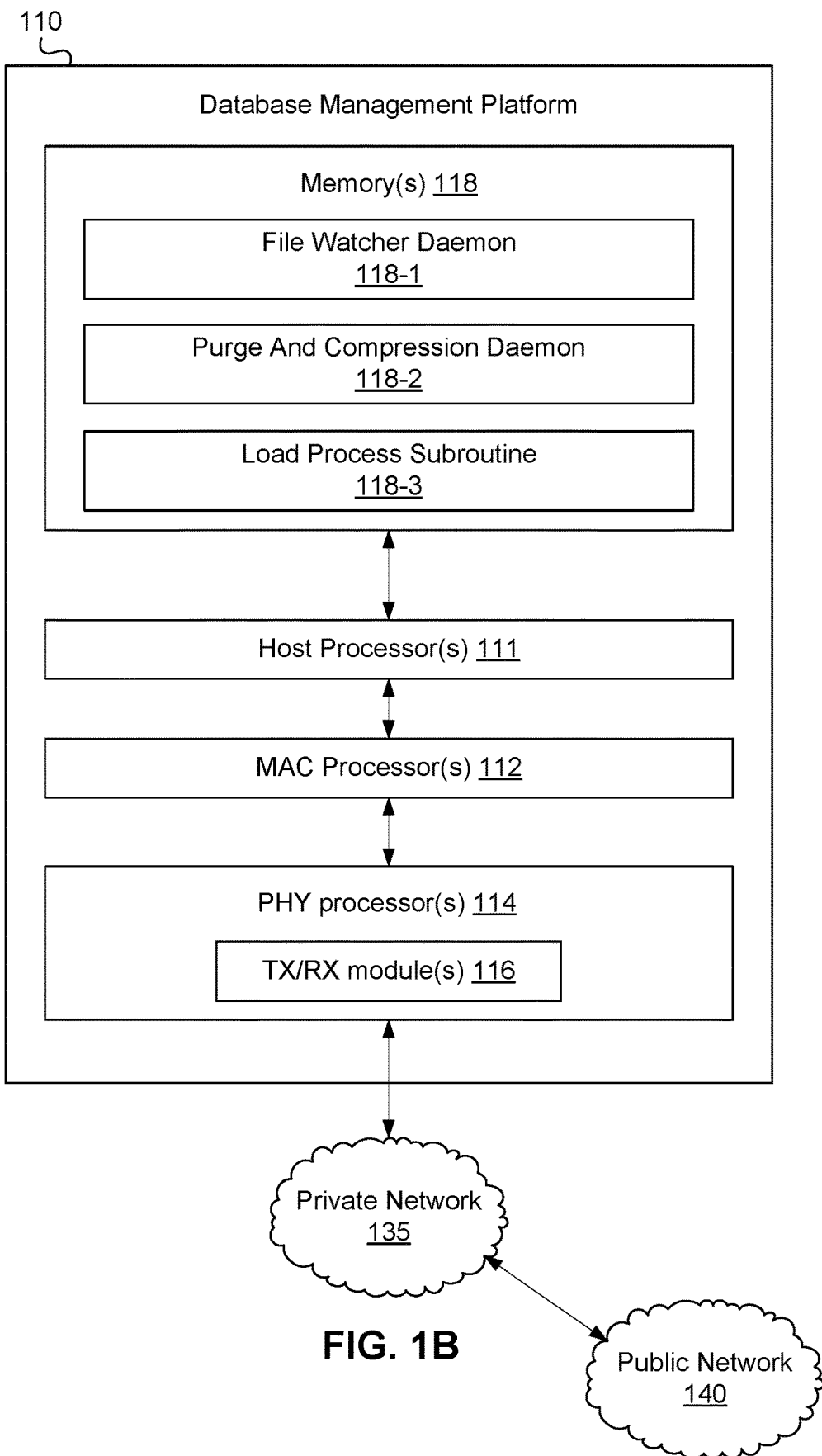

FIGS. 1A and 1B show an illustrative computing environment 100 for database management, in accordance with one or more example arrangements. The computing environment 100 may comprise one or more devices (e.g., computer systems, communication devices, and the like). The computing environment 100 may comprise, for example, a database management platform 110, application server(s) 115, database server(s) 120, and an enterprise user computing device 130. The one or more of the devices and/or systems, may be linked over a private network 135 associated with an enterprise organization. The computing environment 100 may additionally comprise a user device 145 connected, via a public network 140, to the devices in the private network 135. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.).

The application server(s) 115 may comprise one or more computing devices and/or other computer components (e.g., processors, memories, communication interfaces). In addition, the application server(s) 115 may be configured to host, execute, and/or otherwise provide one or more enterprise applications. For example, the private network 135 may be associated with a financial institution and the application server(s) 115 may be configured to host, execute, and/or otherwise provide one or more transaction processing programs, such as an online banking application, loan application processing programs, and/or other programs associated with the financial institution. In addition, the application server(s) 115 may process and/or otherwise execute transactions on specific accounts based on commands and/or other information received from other computer systems comprising the computing environment 100. In some instances, the application server(s) 115 may be configured to provide various enterprise and/or back-office computing functions for an enterprise organization.

The database server(s) 120 may comprise one or more computing devices and/or other computer components (e.g., processors, memories, communication interfaces). The database server(s) 120 may be used to store, modify, and/or retrieve information for one or more enterprise applications and/or users associated with the enterprise organization. The database server(s) 120 may comprise various servers and/or databases that store and/or otherwise maintain information that may be used by applications hosted and executed by the application server(s) 115. With reference to the example where the private network 135 may be associated with a financial institution, the database server(s) 120 may store and/or otherwise maintain account information, such as financial account information including account balances, transaction history, account owner information, and/or other information. The database server(s) 120 may be associated with one or more network database applications that may be used for database management functions. The network database applications may be used to allocate resources of the database server(s) 120 for various purposes. For example, the network database applications may be used to configure production servers, development servers, and/or quality assurance (QA) servers within the resources of the database server(s) 120. Each of the servers may be associated with corresponding databases and scripts/applications configured for performing various operations (e.g., loading feed files, reading databases, editing databases, etc.).

The enterprise user computing device 130 may be a personal computing device (e.g., desktop computer, laptop computer) or mobile computing device (e.g., smartphone, tablet). The enterprise user computing device 130 may be linked to and/or operated by a specific enterprise user (who may, for example, be an employee or other affiliate of the enterprise organization). The enterprise user computing device 130 may be configured to enable an enterprise user to perform various operations on databases stored in the database server(s) 120. For example, the enterprise user computing device 130 may be used to access/modify databases stored in the database server(s) 120 using a front-end portion of a network database application.

The user device 135 may be a computing device (e.g., desktop computer, laptop computer) or mobile computing device (e.g., smartphone, tablet). The user device 135 may be configured to enable the user to access the various functionalities provided by the devices, applications, and/or systems in the private network 135.

In one or more arrangements, the database management platform 110, the application server(s) 115, the database server(s) 120, the enterprise user computing device 130, the user device 145, and/or the other devices/systems in the computing environment 100 may be any type of computing device capable of receiving input via a user interface, and communicating the received input to one or more other computing devices in the computing environment 100. For example, the database management platform 110, the application server(s) 115, the database server(s) 120, the enterprise user computing device 130, the user device 145, and/or the other devices/systems in the computing environment 100 may, in some instances, be and/or include server computers, desktop computers, laptop computers, tablet computers, smart phones, or the like that may comprised of one or more processors, memories, communication interfaces, storage devices, and/or other components. Any and/or all of the database management platform 110, the application server(s) 115, the database server(s) 120, the enterprise user computing device 130, the user device 145, and/or the other devices/systems in the computing environment 100 may, in some instances, be and/or comprise special-purpose computing devices configured to perform specific functions.

FIG. 1B shows an example database management platform 110 in accordance with one or more examples described herein. The database management platform 110 may comprise one or more of host processor(s) 111, medium access control (MAC) processor(s) 112, physical layer (PHY) processor(s) 114, transmit/receive (TX/RX) module(s) 116, memory 118, and/or the like. One or more data buses may interconnect the host processor(s) 111, the MAC processor(s) 112, the PHY processor(s) 114, the Tx/Rx module(s) 116, and/or the memory 118. The database management platform 110 may be implemented using one or more integrated circuits (ICs), software, or a combination thereof, configured to operate as discussed below. The host processor(s) 111, the MAC processor(s) 112, and the PHY processor(s) 114 may be implemented, at least partially, on a single IC or multiple ICs. Memory 118 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 112 and/or the PHY processor(s) 114 of the security platform 120 may be configured to generate data units, and process received data units, that conform to any suitable wired and/or wireless communication protocol. For example, the MAC processor(s) 112 may be configured to implement MAC layer functions, and the PHY processor(s) 114 may be configured to implement PHY layer functions corresponding to the communication protocol. The MAC processor(s) 112 may, for example, generate MAC data units (e.g., MAC protocol data units (MPDUs)), and forward the MAC data units to the PHY processor(s) 114. The PHY processor(s) 114 may, for example, generate PHY data units (e.g., PHY protocol data units (PPDUs)) based on the MAC data units. The generated PHY data units may be transmitted via the TX/RX module(s) 116 over the private network 155. Similarly, the PHY processor(s) 114 may receive PHY data units from the TX/RX module(s) 114, extract MAC data units encapsulated within the PHY data units, and forward the extracted MAC data units to the MAC processor(s). The MAC processor(s) 112 may then process the MAC data units as forwarded by the PHY processor(s) 114.

One or more processors (e.g., the host processor(s) 111, the MAC processor(s) 112, the PHY processor(s) 114, and/or the like) of the database management platform 110 may be configured to execute machine readable instructions stored in memory 118. The memory 118 may comprise (i) one or more program modules/engines having instructions that when executed by the one or more processors cause the database management platform 110 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the database management platform 110 and/or by different computing devices that may form and/or otherwise make up the database management platform 110. For example, the memory 118 may have, store, and/or comprise a file watcher daemon 118-1, purge and compression daemon 118-2, and a load process subroutine 118-3. The file watcher daemon 118-1, purge and compression daemon 118-2, and a load process subroutine 118-3 may have instructions that direct and/or cause the database management platform 120 and/or the database server(s) 120 to perform one or more operations as discussed herein.

While FIG. 1A illustrates the database management platform 110, the application server(s) 115, the database server(s) 120, and the enterprise user computing device 130 as being separate elements connected in the private network 135, in one or more other arrangements, functions of one or more of the above may be integrated in a single device/network of devices. For example, elements in the database management platform 110 (e.g., host processor(s) 111, memory(s) 118, MAC processor(s) 112, PHY processor(s) 114, TX/RX module(s) 116, and/or one or more program/modules stored in memory(s) 118) may share hardware and software elements with and corresponding to, for example, the application server(s) 115, the database server(s) 120, and/or the enterprise user computing device 130.

FIGS. 2A-2C show traditional techniques associated with database management in servers, in accordance with one or more arrangements. FIG. 2A shows an example block diagram illustrating traditional procedures for correction of errors in loading feed files to a database corresponding to a production server. Data to be stored in a production server 204 may be received in the form of feed files and may be held in the source folder 208 associated with the production server 204. Scripts/applications 212, configured for the production server 204, may be used to load the feed files to source server databases 216. The feed files may be moved, from the source folder 208, to the destination folder 220 associated with the production server 204. The destination folder 220 may comprise feed files that were successfully loaded to the source server databases 216 (e.g., loaded feed files 220-1) and feed files that were rejected from being loaded (e.g., rejected feed files 220-2) to the source server databases 220-2. Feed files may be rejected for a variety of reasons including, but not limited to, feed file hierarchy, format errors in the feed file entries, improper data type in the feed files, etc. Further details related to rejection of feed files are described with reference to FIGS. 3A and 3B. Since the server databases 216 are associated with a production server (e.g., the production server 204), there may be restrictions on access to the feed files and/or an ability to run scripts for efficient correction of rejected feed files. The rejected feed files 220-2 may be corrected using inefficient trial and error techniques at block 224 and reloaded to the server databases 216. This may a time and resource intensive process and may not accurate.

FIG. 2B shows an example block diagram illustrating traditional procedures for synchronization of databases between two servers. Databases associated with a destination server 234 may be synchronized to databases associated with a source server using mirroring/log shipping or by using backup and restore techniques using an intermediary storage 238. However, log shipping may require both the destination server 234 and the source server 230 to have equivalent capabilities (e.g., memory capacities), which may not always be the case. For example, the source server 230 may be a production server while the destination server 234 may be a development/QA server which may have lower memory capacity than a production server. Further, log shipping requires both the destination server 234 and the source server 230 to always be online which may impose restriction on applicability of these methods. Backup and restore techniques require additional memory resources (e.g., corresponding to intermediate storage 238) to which a database has to be backed up.

FIG. 2C shows an example block diagram illustrating traditional procedures for migration of databases between servers corresponding to different network database applications. For example, production server 254 and development server 258 may be associated with an old network database application 250, while production server 264 and development server 268 may be associated with a new network database application. While multiple databases may be migrated simultaneously (e.g., from servers corresponding to the old network database application 250 to servers corresponding to the new network database application), to ensure reliability of services provided to end users of the databases, parallel monitoring, development, and testing may need to be performed on servers and applications corresponding to both old and new network database applications. This may be resource intensive process since the migrated databases may be large. Further, performance of the databases associated with servers corresponding to the new network database application 260 may not be apparent until considerable resources have already been expended for migration. Various examples described herein may enable more efficient synchronization, migration, and correction of data stored in servers.

Figure 3A:
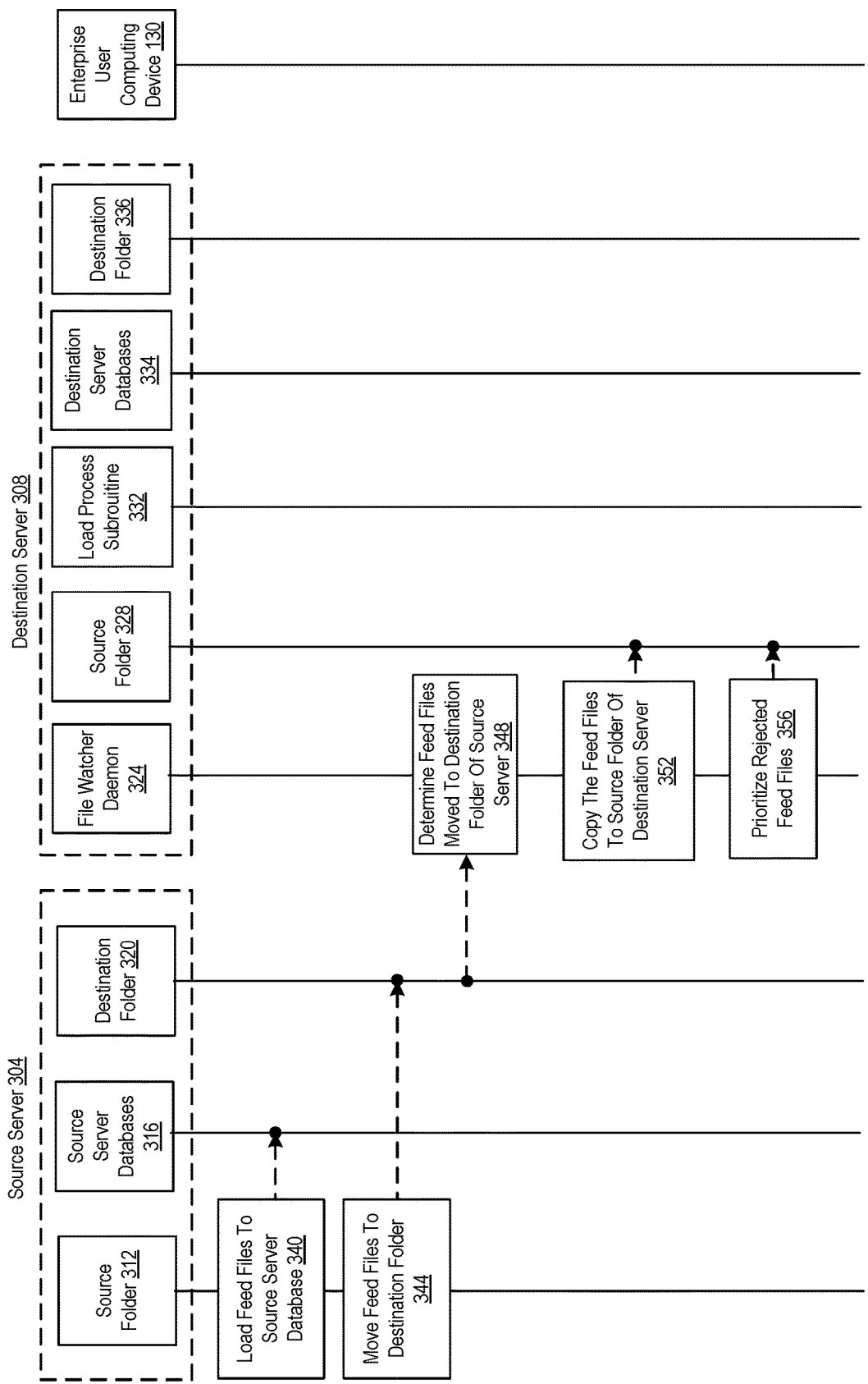
FIGS. 3A and 3B shows an example event sequence for synchronization and/or migration of data between two servers, in accordance with one or more example arrangements.
Figure 3B:
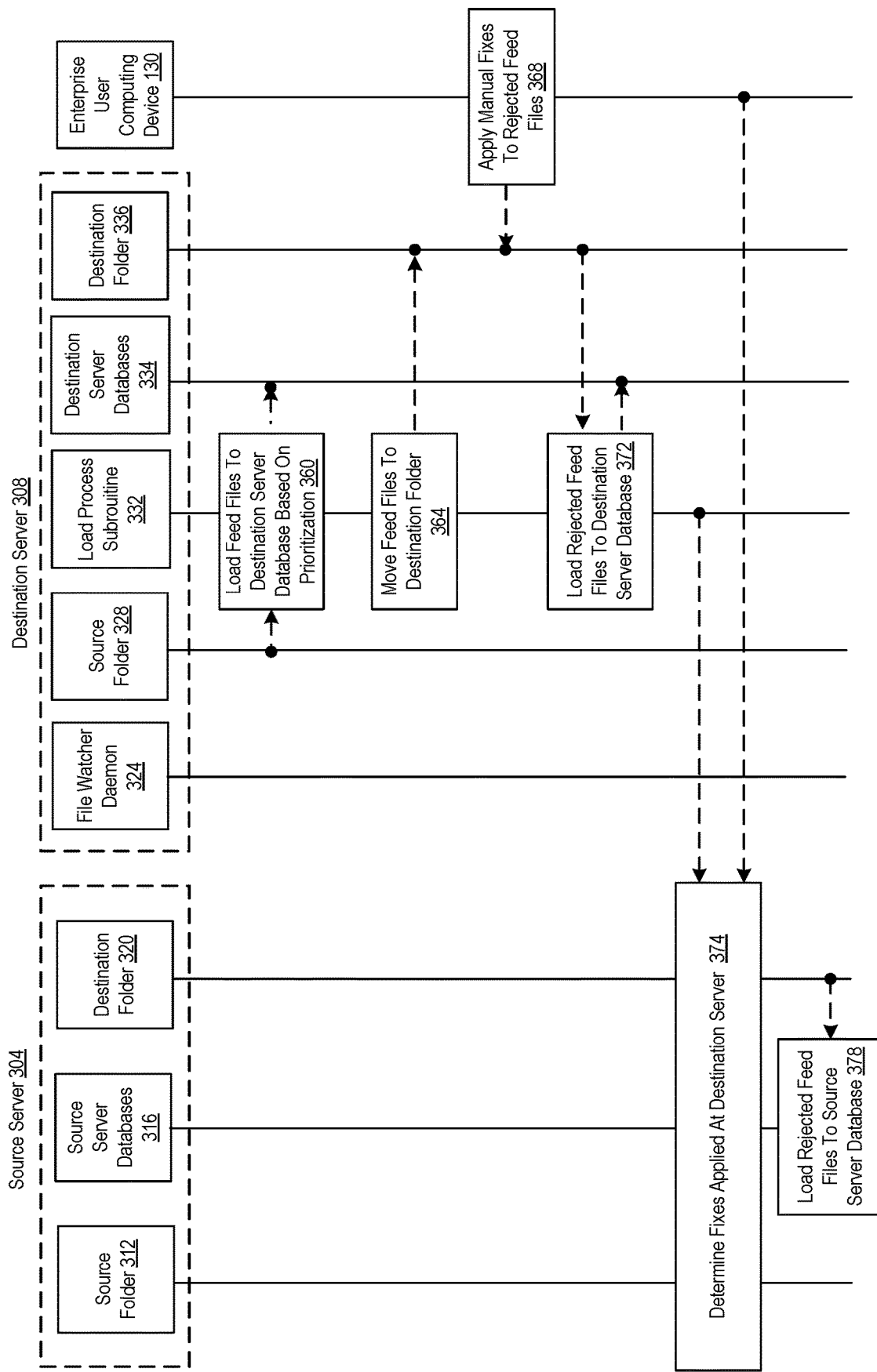

FIGS. 3A and 3B shows an example event sequence for synchronization and/or migration of data between two servers, in accordance with one or more example arrangements. The example event sequence may be used for synchronization and/or migration of data, received at a source server 304, to a destination server 308. The source server 304 and the destination server 308 may be associated with different network database applications or different versions of a same network database application. In other examples, the source server 304 and the destination server 304 may be associated with a same (or same version of a) network database application. The source server 304 may correspond to a higher level environment (e.g., the source server 304 may be a production server) and the destination server 308 may correspond to a lower level environment (e.g., the destination server 308 may be a development server or a QA server). Alternatively, the source server 304 and the destination server 308 may both be production servers.

The database management platform 110 may configure the source server 304 with corresponding source folder 312 and destination folder 320. Similarly, the database management platform 110 may configure the destination server 308 with corresponding source folder 328 and destination folder 336. Various operations described with reference to FIGS. 3A and 3B may be performed by the database server(s) 120 and/or based on instructions stored in the database management platform 110.

Data to be stored in the source server 304 may be received via the private network 135 in the form of feed files and may be held in the source folder 312 associated with the source server 304. The feed files may be received based on (or in response to) instructions from the application server(s) 115 or from the enterprise user computing device 130. Feed files may be in any format (e.g., .txt, .csv, .xml, etc.). At step 340, the source server may attempt to load one or more of the feed files in the source folder 312 to the source server databases 316 (e.g., in a memory associated with the source server 304). The feed files may be attempted to be loaded in the order in which the feed files are received at the source folder 312. The feed files may be loaded in the source server databases 316 based on one or more scripts/applications that may be associated with the source server 304. For example, the scripts/applications may indicate the feed files and/or the tables (in the source server databases 316) at which the data in the feed files is to be loaded.

Figures 4A, 4B, 4C:
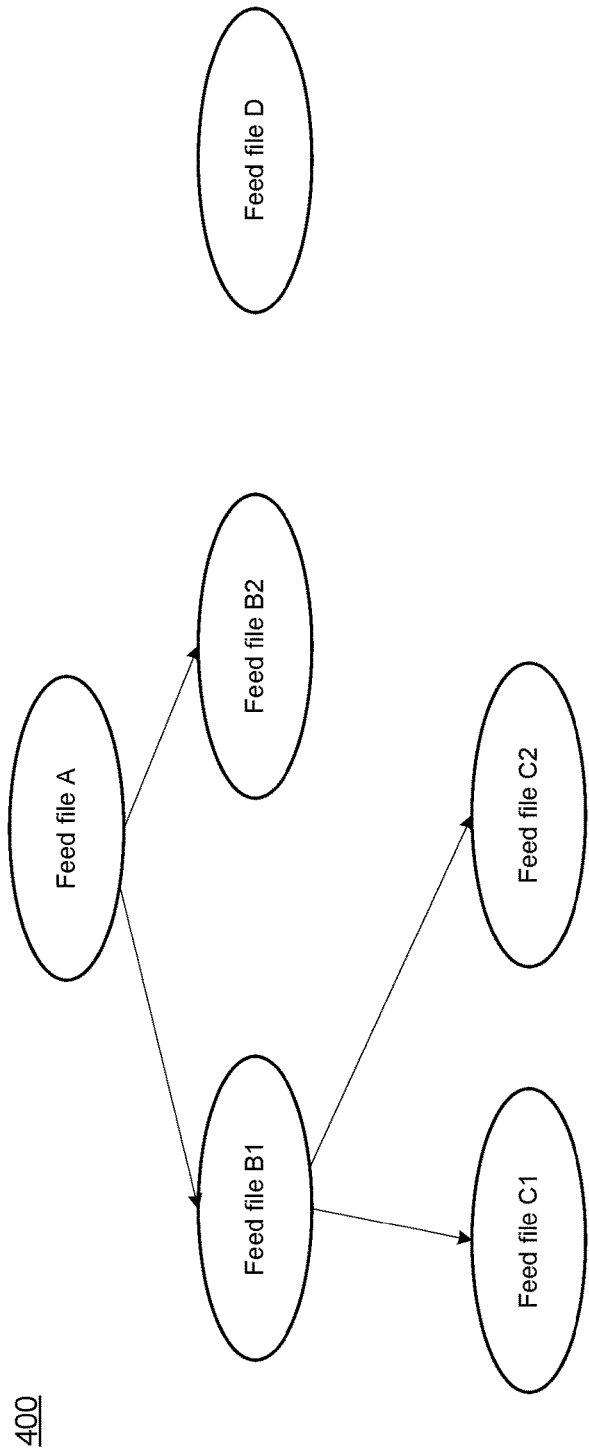
FIG. 4A-4C shows an example hierarchy of feed files that may be loaded in server databases, in accordance with one or more example arrangements.

At least some of the feed files may be rejected from the source server databases 316 (e.g., fail to load to the source server databases 316). For example, the feed files may follow a hierarchical database model and loading of the feed files may be constrained by the feed file hierarchy. FIG. 4A shows an example hierarchy 400 of feed files that may be loaded in server databases. Feed file A may be a parent of feed files B1 and B2. Feed file B2 may itself be a parent of feed files C1 and C2. Feed file A being a parent of feed files B1 and B2 may comprise that an entry in the feed file A is referenced/indicated in feed files B1 and B2. Similarly, feed file B1 being a parent of feed files C1 and C2 may comprise that an entry in the feed file B1 is referenced/indicated in feed files C1 and C2. Feed file D may be unrelated to the hierarchy of feed files A, B1, B2, C1, and C2.

For example, the database hierarchy 400 may correspond to a financial organization and comprise feed files storing client information. Feed file A may comprise a listing of client names and associated personal information. Children of feed file A (e.g., feed files B1, B2, etc.) may comprise a listing and information with accounts held by each individual client listed in feed file A. For example, feed file B1 may indicate accounts associated with a first client, feed file B2 may indicate accounts associated with a second client, etc. Children of feed files B1, B2, etc., may indicate information associated with each of the accounts listed in feed files B1, B2, etc. For example, feed files C1, C2, etc., may indicate account details (e.g., transactions) associated with accounts listed in feed file B1 for the first client.

Data in a feed file may be stored in the form of a table in server databases. Consider an example where the database hierarchy 400 is used for a book library. As shown in FIG. 4B, feed file A may comprise a table 410 with membership numbers, names, and subscription categories associated with all subscribers of the library. Each column corresponds to attributes associated with the subscribers while each row comprises information corresponding to a specific subscriber. Feed file B1 and feed file B2 may comprise a listing of books currently checked out by two different subscribers referenced in feed file A. For example, FIG. 4C shows an example feed file B1 comprising a table 420 that indicates a listing of books currently checked-out by subscriber 325 and corresponding return dates of the books. The membership number indicated in the table 420 may be used to link the table 420 (feed file B1) to its parent table 410 (feed file A). Feed file D may include non-subscriber information (e.g., finances associated with the library).

With reference to step 340 of FIG. 3A, a feed file may be rejected for not following a feed file hierarchy. For example, a child feed file may be rejected if a parent feed file is not loaded prior to attempting loading of the child feed file. For example, feed files B1 and B2 (as shown in FIG. 4) may be rejected if feed file A has not been received and loaded in the source server databases 316 prior to attempting loading of feed files B1 and B2.

Feed files may be rejected for other reasons as well. Feed files may be configured such that entries in a feed file must correspond to defined data types (e.g., integer, character, etc.). A feed file may be rejected if an entry does not correspond to a defined data type for that entry (e.g., if an entry has a different number of characters than the number of characters defined for the entry, or is in a data type that is different from the data type defined for the entry). With reference to the example database hierarchy 400 used for a library, for example, data type of "membership numbers" may be an integer data type (with a predefined quantity of digits) and data type of "names" may be character data type. Consequently, feed file A may be rejected if a membership number does not correspond to an integer data type and/or if it does not have the predefined quantity of digits. A feed file may also be rejected if the feed file includes private/confidential data that must not be accessible to users associated with a server.

At step 344, and after the feed files are attempted to be loaded to the destination server databases 316, the feed files may be moved to the destination folder 320 associated with the source server 304. The feed files in the destination folder 320 may include both rejected feed files and feed files that were successfully loaded to the source server databases 316.

At step 348, the file watcher daemon 324 in the destination server 308 may determine the feed files in the destination folder 320. At step 352, the file watcher daemon 324 may copy the feed files in the destination folder 320 to the source folder 328 in the destination server 308.

At step 356, the file watcher daemon 324 may prioritize the rejected feed files in the source folder 328 for loading to destination server databases 334. Prioritizing loading of a rejected feed file may comprise aborting loading of any other feed files currently being loaded. The aborting of other feed files may be based on one or more criteria. For example, if another feed file is currently being loaded to the destination server databases 334, the file watcher daemon 324 may determine an expected time remaining for the loading process of the another feed file to complete. If the expected time remaining is greater than a threshold time period, the file watcher daemon 324 may abort loading the another feed file and process loading of a prioritized rejected feed file. However, if the expected time remaining is less than a threshold time period, the file watcher daemon 324 may wait until the another feed file is loaded and process loading of the prioritized rejected feed file after completion of loading of the another feed file. For feed files rejected based on feed file hierarchy considerations, prioritizing the rejected feed file may comprise prioritizing a parent feed file of the rejected feed file.

At step 360, the load process subroutine 332 may load feed files (in the source folder 328) to the destination server databases 334. Loading the feed files may comprise loading the rejected feed files based on the prioritization as determined by the file watcher daemon 324. With reference to a feed file that was rejected for not following a feed file hierarchy, the load process subroutine 332 may determine a feed file hierarchy of the rejected feed file and initiate loading of a feed file that is a parent of the rejected feed file prior to loading the rejected feed file. With reference to the example of FIG. 4, if feed file B1 was rejected at the source server databases 316 because feed file A was not loaded at the source server databases 316 prior to attempting loading of feed file B1, the file watcher daemon 324 may prioritize loading of feed file B1. The load process subroutine 332 may determine the feed file hierarchy of feed file B1 and determine that feed file A is the parent of feed file B1. The load process subroutine 332 may load feed file A prior to loading the prioritized feed file B1.

Loading a parent feed file of the rejected feed file may comprise that the destination server 308 sends a request for the parent feed file to the source server 304. Based on the request, the source server 304 may send the parent feed file to the destination server 308. Additionally, or alternatively, the file watcher daemon 324 may copy the parent feed file from the destination folder 320 to the source folder 328 for loading to the destination server databases 334. The load process subroutine 332 may then load the parent feed file and the rejected feed file.

The load process subroutine 332 may additionally use machine learning algorithms to correct the rejected feed files prior to loading the rejected feed files. For example, the load process subroutine 332 may use a machine learning engine to correct formatting/data type errors in a feed file prior to loading the rejected feed file to the destination server databases 334. After the prioritized feed files are loaded to the destination server databases 334, the load process subroutine may load other feed files (including feed files that may have been aborted) to the destination server databases 334.

The feed files may be loaded in the destination server databases 334 based on one or more scripts/applications that may be associated with the destination server 308. For example, the scripts/applications may indicate the feed files and/or the tables (in the destination server databases 334) at which the data in the feed files is to be loaded. At least some feed files in the source folder 328 may still be rejected from (e.g., fail to load to) the destination server databases 334 and may require manual intervention, analysis, and correction.

At step 364, the feed files in the source folder 328 may be moved to the destination folder 336 of the destination server 308. The feed files moved to the destination folder 336 may include both feed files rejected at step 360 and feed files that were successfully loaded to the destination server databases 334 (e.g., following feed file prioritization).

At step 368, the enterprise user computing device 130 may be used to apply manual fixes to feed files that were rejected at step 360. An enterprise user may review and apply corrections to the rejected feed files using the enterprise user computing device 130. For example, the enterprise user may correct errors in the rejected feed files that the load process subroutine 332 may have been unable to correct. At step 372, and after the manual fixes have been applied, the load process subroutine 332 may load the rejected feed files (in the destination folder 336) to the destination server database 334.

At step 374, the source server 304 may determine the feed file hierarchy, corrections (as determined by the load process subroutine 332), and/or the manual fixes applied at the destination server 308. For example, the load process subroutine 332 may send the feed file hierarchy and/or indications of parent feed files that correspond to feed files initially rejected at the source server databases 316 at step 340. With reference to example of feed file B1 was rejected at the source server databases 316 because feed file A was not loaded at the source server databases 316 prior to attempting loading of feed file B1, the destination server 308 may send, to the source server 304 an indication of the parent feed file A of the rejected feed file B1.

At step 378, the source server 304 may load the rejected feed files in destination folder 320 to the source server databases 316 based on the determination at step 374. For example, the source server 304 may load the parent feed file A prior to loading the rejected feed file B1. In another example, the source server 304 may load rejected feed files to the source server databases 316 after applying the manual fixes (e.g., as input using the enterprise user computing device 130 at step 368) to the rejected feed files.

The event sequence of FIGS. 3A and 2B may enable efficient synchronization between two servers. Feed files received at the source server 304 may be immediately made available and loaded in the destination server 308 by the use of the file watcher daemon. If the destination server 308 is a development server, corrections may be applied to feed files in a more accurate, flexible, and time-efficient manner without requiring trial and error methodologies at the source server 304. Using a development server for applying corrections may enable developers to access data who may be able to use their expertise to fix any issues. Further, the techniques described with reference to FIGS. 3A and 3B enables real-time loading of data at the destination server without requiring the usage of source server resources.

Figure 5:
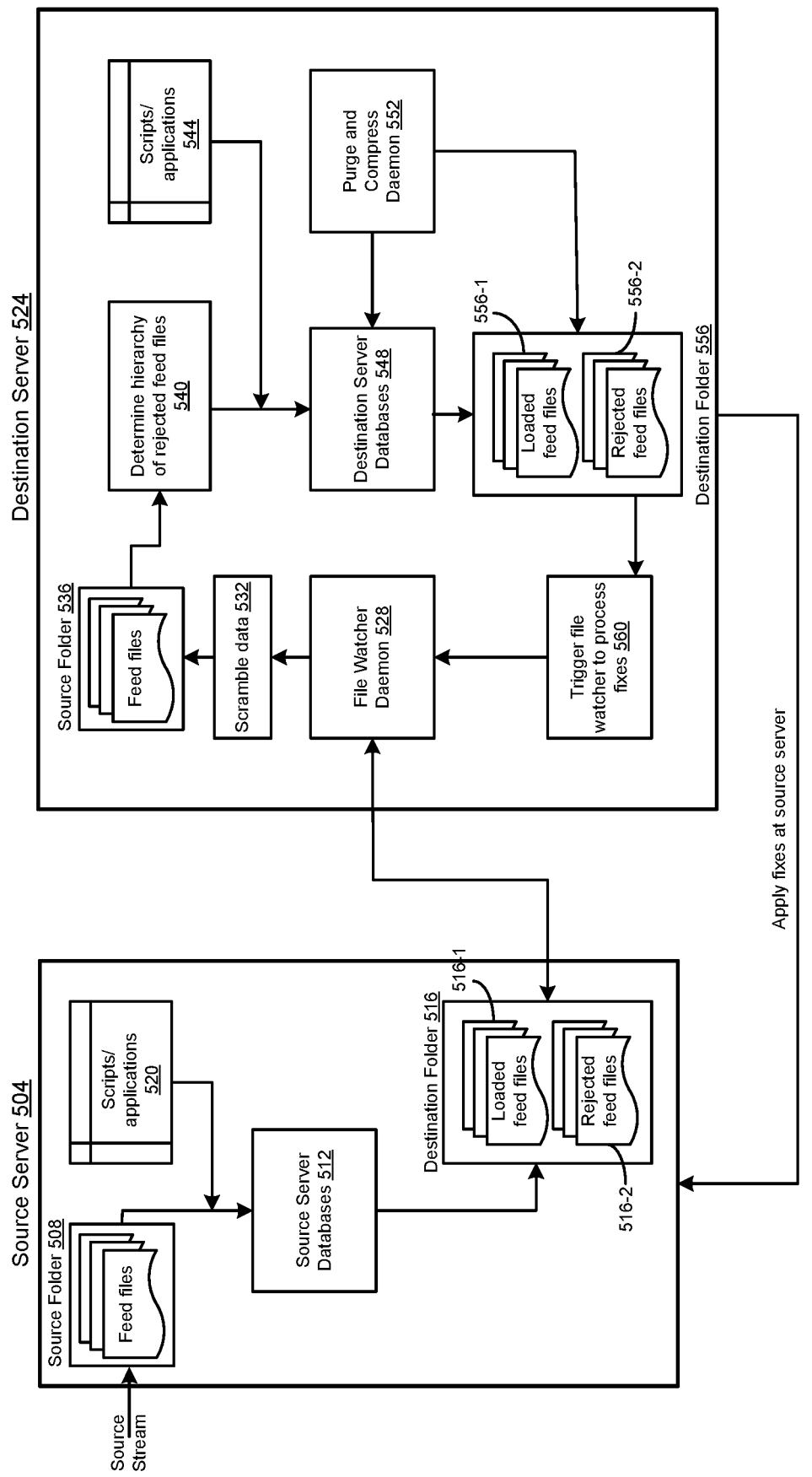
FIG. 5 shows a block diagram showing interaction between various elements of a source server and a destination server for synchronization of databases and/or correction of errors in loading feed files, in accordance with one or more example arrangements.

FIG. 5 shows a block diagram showing interaction between various elements of a source server and a destination server for synchronization of databases and/or correction of errors in loading feed files. The source server 504 may be a production server and the destination server 524 may be a development server. Feed files from a source stream may be loaded in a source folder 508 of the source server 504. Scripts/applications 520 may process loading of the feed files from the source folder 508 to source server databases 512. At least some of the feed files (rejected feed files) may fail to load to the source server databases 512 (e.g., based on various issues described with reference to FIG. 3A). Feed files from the source folder 508 may be moved to the destination folder 516. The destination folder 516 may comprise feed files 516-1 that were successfully loaded to the source server databases 512 and rejected feed files 516-2.

The file watcher daemon 528 may determine the feed files (e.g., successfully loaded feed files 516-2 and rejected feed files 516-2) in the destination folder 516 and copy the feed files to source folder 536 of the destination server 524. Copying the feed files to the source folder 536 may comprise scrambling specific columns of the feed files based on various criteria. For example, the file watcher daemon 528 may scramble specific columns of the feed files that may be associated with personal information of users associated with the enterprise organization.

At step 540, the destination server 524 may determine hierarchy of feed files that were rejected because corresponding parent feed files were not previously loaded to the source database server 512. The destination server 524 may load the feed files in the source folder 536 to destination server databases 548. Loading the feed files to the destination server databases 548 may comprise loading parent feed files prior to loading feed files that were rejected for not following feed file hierarchy. For example, at step 560, the destination server 524 may trigger the file watcher daemon 528 to copy parent feed files from destination folder 516 to the source folder 536 for loading to the destination server databases 548. Scripts/applications 544 may process loading of the feed files from the source folder 536 to the destination server databases 548. Feed files from the source folder 536 may be moved to destination folder 556 of the destination server 524. The destination folder 556 may comprise feed files 556-1 that were successfully loaded to the destination server databases 548 and rejected feed files 556-2 that may require manual intervention for fixing. Following manual intervention (e.g., via the enterprise user computing device 130), the rejected feed files 556-2 may be loaded to the destination server databases 548.

In addition to the fixes applied to the feed files, there may be fixes applied to the scripts/applications 544. For example, an enterprise user associated with the enterprise user computing device 130 may to fix/edit the scripts/applications 544. Fixes and/or feed file hierarchy applied for loading the feed files to the destination server databases may be applied to feed files (e.g., rejected feed files 516-2) at the source server 504. For example, parent feed files of the rejected feed files 516-2 may be loaded to the source server databases 512 prior to loading the rejected feed files 516-2. Further, fixes applied to the scripts/applications 544 may also be applied to the scripts/applications 520.

If the destination server 524 is a development server, memory resources available at the destination server 524 may be lower than the memory resources available at the source server 504. Purge and compress daemon 552 may be used to purge and compress databases in the destination server databases 548 to ensure that memory resources occupied by the stored databases at the destination server 524 does not exceed the available memory resources. Further details relating to operation of the purge and compress daemon 552 are described with reference to FIG. 9.

Applying corrections at a development server (e.g., the destination server 524) as described in FIG. 5 may enable use of scripts/apps and administrator access to databases that may not be possible at a production server (e.g., the source server 504). This may avoid necessitating resource intensive trial and error fixes at the production server.

In legacy systems, migration of databases between different network database applications may comprise simultaneous migration of multiple databases (e.g., corresponding to multiple feed files) from the source server to a destination server. Further, multiple servers (production servers, development servers, QA servers, etc.) may need to be maintained for the databases corresponding to both the previous network database application and the new network database application (e.g., as described with reference to FIG. 2C) for considerable periods of time while the development and testing is completed in the servers corresponding to the new network database application. Various procedures described herein may enable incremental migrating of a feed file (e.g., in real time) to the destination server databases as and when it is loaded in the source server databases. The system may determine performance of a database corresponding to the feed file loaded to the destination server and compare it with the performance of a database corresponding to the feed file loaded to the source server. Determining the performance may comprise determine the latency associated with the data loaded in the destination server, a memory occupied by the data, etc. This may avoid migration, development, and testing of all databases moved from the source server to the destination server in a collective manner which may result in increased resource usage. A developer team associated with the source server may monitor performance of an individual feed file as loaded to the destination server, and further perform development and testing, as and when a feed file is moved to the destination server. This may enable a smoother transition to a new network database application that is associated with the destination server without waiting for significant periods of time for monitoring performance and performing development and testing of multiple databases in the new network database application.

Figure 6:
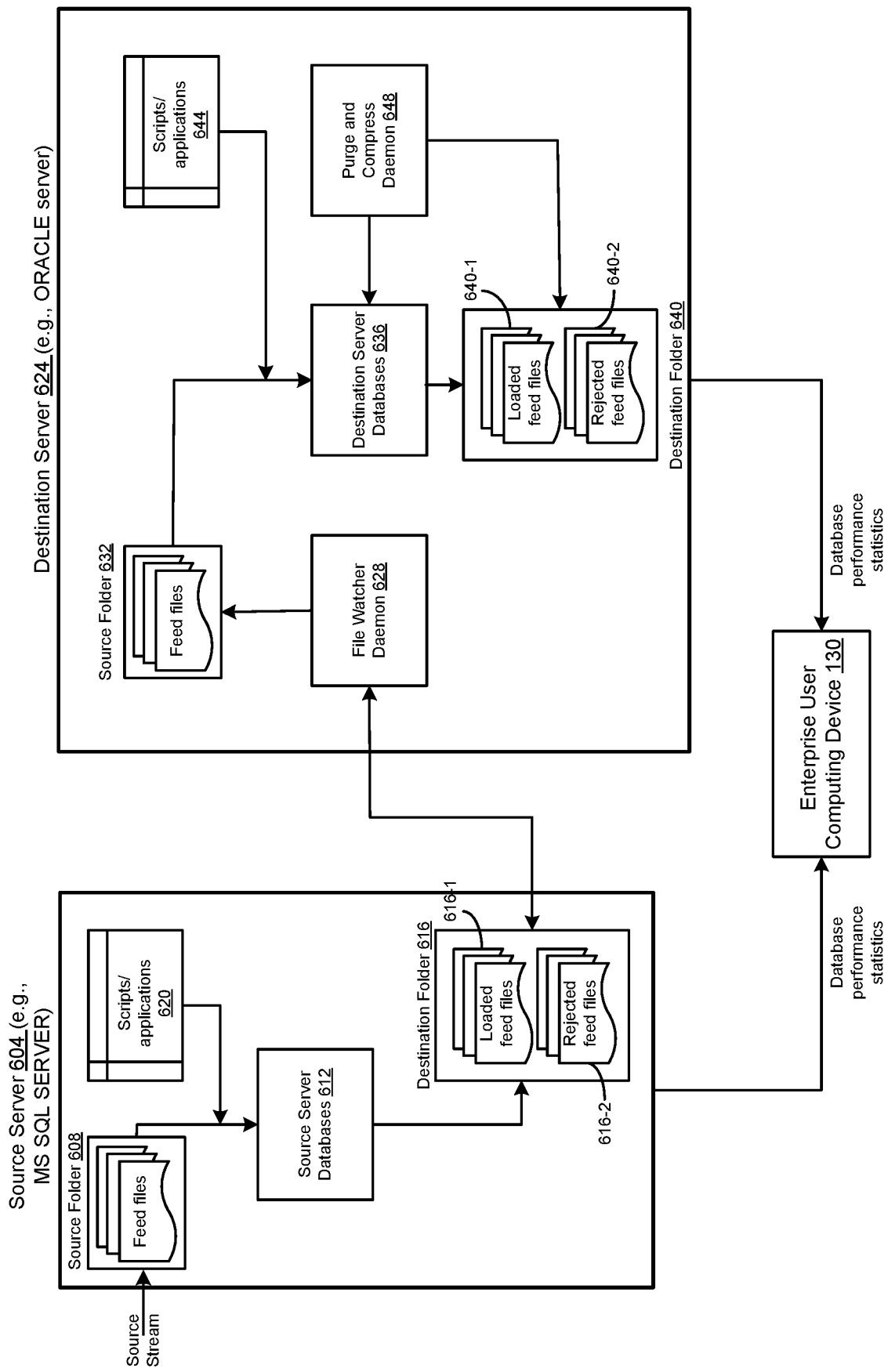
FIG. 6 shows a block diagram showing interaction between various elements of a source server and a destination server for migration of databases, in accordance with one or more example arrangements.

FIG. 6 shows a block diagram showing interaction between various elements of a source server and a destination server for migration of databases. The source server 604 and the destination server 624 may correspond to different network database applications (e.g., different RDBMSs) or different versions of a same network database application (e.g., different versions of a same RDBMS). The source server 604 may correspond to a production server and the destination server 624 may correspond to a production server, a development server, or a QA server.

As described above, feed files received via a source stream may be moved to the source folder 608. The source server 604 may use scripts/applications 620 to load the feed files to the source server databases 612. The feed files may then be moved to a destination folder 616. The file watcher daemon 628 may copy a feed file, of the feed files in the destination folder 616, to the source folder 632 of the destination server 624. The destination server 624 may use scripts/applications 644 to load the feed file to the destination server databases 636. Copying the feed file from the destination folder 616 to the source folder 632 may be based on one or more instructions received from the enterprise user computing device 130.

An enterprise user may monitor, via the enterprise user computing device 130, the performance of the feed file loaded to the destination server databases 636. Performance statistics of data associated with the single feed file may be determined by the destination server 624 when the feed file is loaded to the destination server databases 636. For example, resource usage (e.g., memory usage), latency, etc., at the destination server 624 may be determined for the feed file loaded to the destination server databases 636. Memory usage may correspond to memory resources used for storing the feed file in a table at the destination server databases 636. The feed file loaded to the destination server databases 636 may be stored in the form of a table. Latency may correspond to a time required for loading the feed file to the destination server databases 636, time required for reading/modifying the table corresponding to the feed file, etc.

Similar performance statistics may also be determined for the feed file at the source server 604 when the feed file is loaded the source server databases 612. The performance statistics at the source server 604 and/or the destination server 608 may be sent to the enterprise user computing device 130. An enterprise user may compare performance of the feed file loaded at the source server 604 and the destination server 624 to determine whether migration to the destination server 624 would be beneficial (e.g., result in reduced use of memory resources, reduced latency, etc.). After the feed file is loaded to the destination server databases 636, a second feed file may similarly be migrated from the source server databases 612 to the destination server databases 636 and performance may be similarly compared.

Loading of feed file in an incremental manner may be controlled based on instructions from the enterprise user computing device 130. For example, an enterprise user associated with the enterprise user computing device 130 may elect to load a feed file, among the plurality of feed files at the destination folder 616, to the destination server databases 636. The enterprise user computing device 130 may send an indication to the destination server 624 to process loading the feed file to the destination server databases 636. The enterprise user may compare the performance of the feed file at the destination server 636 and the source server 612. The enterprise user may then elect to load a second feed file, among the plurality of feed files at the destination folder 616, to the destination server databases 636 and similarly compare performance at the destination server 636 and the source server 612.

Incremental loading of feed files may enable monitoring of performance for individual feed file as and when they are migrated to the destination server 624. Further, development and testing may be performed incrementally on feed files as and when the feed files are loaded to the destination server databases 636. This may reduce time and resources required for performance monitoring at the destination server 624 and for development and testing in contrast to traditional migration techniques that may simultaneously migrate all data stored in the source server databases 612 to the destination server databases 636.

Other operations corresponding to rejected feed files, prioritization of feed files, manual fixes, etc., may be performed in a manner as described with reference to FIGS. 3A, 3B, and 5, and are not described in further detail for brevity. For example, rejected feed files 616-2 and rejected feed files 640-2 may be processed in a manner similar to as described with reference to FIG. 5.

Figure 7:
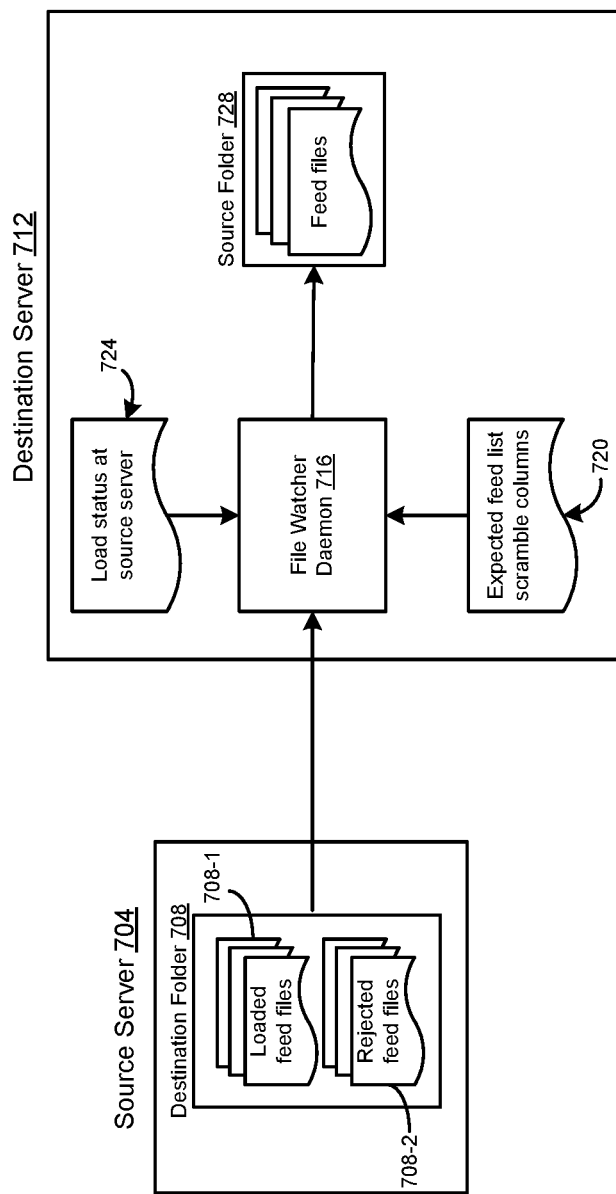
FIG. 7 shows an example operation of a file watcher daemon as used in a destination server, in accordance with one or more example arrangements.

FIG. 7 shows an example operation of a file watcher daemon as used in a destination server. Source server 704 and destination server 712 may correspond to source servers and destination servers as described with reference to FIGS. 3A, 3B, 5, and 6. Destination folder 708 associated with the source server 704 may comprise loaded feed files 708-1 and rejected feed files 708-2 in accordance with the various procedures described previously. File watcher daemon 716 may perform one or more operations as described with reference to file watcher daemons 324, 528, and 628 in FIGS. 3A, 3B, 5, and 6.

As described previously, the file watcher daemon 716 may determine feed files in the destination folder 708 associated with the source server 704 and copy the feed files to a source folder 728 associated with the destination server 712. The feed files may include both loaded feed files 708-1 (e.g., feed files that were successfully loaded to source server databases) and rejected feed files 708-2 (e.g., feed files that failed to load to the source server databases). Load status of feed files at the source server 704 may be indicated in a load status file 724. The load status file 724 may indicate whether a particular feed file in the destination folder 708 was successfully loaded in or rejected from the source server databases 704. The file watcher daemon 716 may determine the rejected feed files 708-2 based on indications in the load status file 724 and prioritize the rejected feed files 708-2 for loading to destination server databases (e.g., as described with reference to FIGS. 3A and 3B). The file watcher daemon 716 may indicate the prioritized feed files to a load process subroutine operating in the destination server 712. If another feed file is currently being loaded, the file watcher daemon 716 may indicate to the load process subroutine to abort loading the another feed file and process loading the prioritized feed file. Aborting loading of another feed file may be based on a time period remaining for completion of loading of the another feed file. If a time period remaining for completion of loading of another feed file is greater than a threshold, the file watcher daemon 716 may indicate to the load process subroutine to abort loading the another feed file and process loading the prioritized feed file. If a time period remaining for completion of loading of another feed file is less than a threshold, the file watcher daemon 716 may allow the load process subroutine to complete loading the another feed file before initiating loading of the prioritized feed file.

The file watcher daemon 716 may also be configured to scramble certain columns in the feed files when copying the feed files to the source folder 728. For example, certain columns in feed files may indicate personal data corresponding to clients associated with the enterprise organization. If the destination server 712 is a development server it may not be appropriate for this personal data to be made accessible to users associated with the destination server 712. A scramble columns file 720 may indicate specific columns, of feed files expected to be loaded to the destination server databases, that may be scrambled prior to the loading. For example, with reference to feed file A shown in FIG. 4B, the scramble columns file 720 may indicate that the column "member name" must be scrambled (or deleted) prior to loading.

Figure 8:
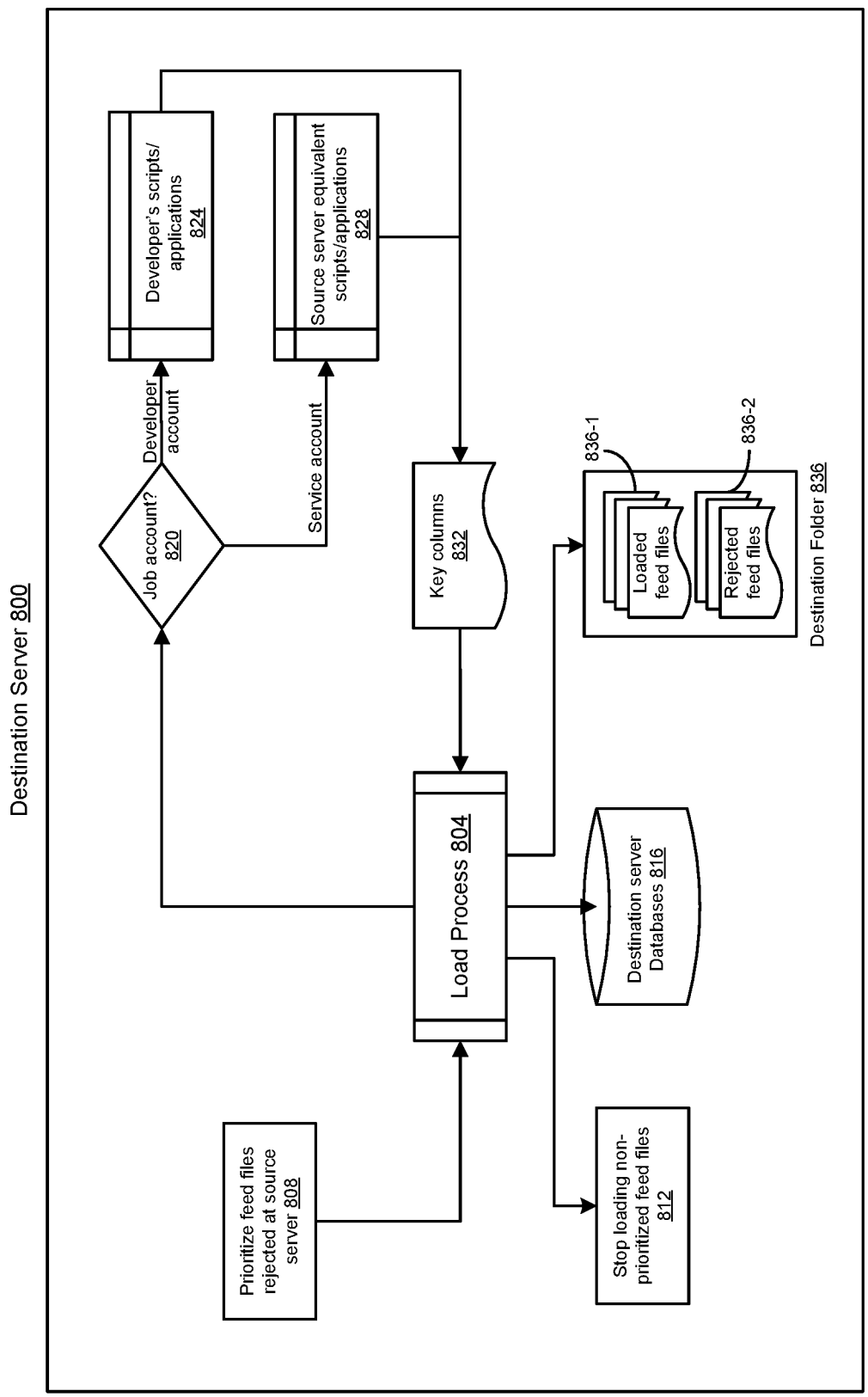
FIG. 8 shows an example operation of a load process subroutine as used in a destination server, in accordance with one or more example arrangements.

FIG. 8 shows an example operation of a load process subroutine as used in a destination server. Destination server 800 may correspond to destination servers as described with reference to FIGS. 3A, 3B, 5, 6, and 7. Load process 804 may load feed files to destination server databases 816 based on one or more considerations described with reference to FIG. 8.

The load process 804 may load feed files from a source folder (e.g., source folder 536 as described with reference to FIG. 5) to the destination server databases 816. At step 808, the destination server 800 may prioritize feed files that may have been rejected at a source server. Prioritization of rejected feed files may be based on one or more indications received from the file watcher daemon (e.g., as described above with reference to FIG. 7).

Prioritization of a rejected feed file may comprise aborting loading of one or more other feed files in the process of being loaded to destination server databases 816 (e.g., as shown in step 812). Aborting loading of a feed file may be based on a time remaining to complete loading of the feed file to the destination server databases. If a time period remaining for completion of loading of another feed file is greater than a threshold, the load process 804 abort loading the another feed file and process loading the prioritized feed file. If a time period remaining for completion of loading of another feed file is less than a threshold, the load process 804 may complete loading the another feed file before initiating loading of the prioritized feed file. In another example, and as described with reference to FIG. 7, the file watcher daemon may determine whether to abort loading based on a time period remaining.

The load process 804 may be initiated as part of an automated batch mode processing at a destination server or based on a developer input (e.g., via the enterprise user computing device 130). For example, the load process 804 may be initiated as part of an automated batch processing if the destination server 800 is a production server to which data is being copied from another production server. The load process 804 may be initiated based on developer input, for example, if the destination server 800 is a development server to which a developer wants to copy data from a production server. As another example, the load process 804 may be initiated based on developer input, for example, if the destination server 800 is a production server to which a developer wants to incrementally migrate data from another production server corresponding to a different network database application (e.g., as described with reference to FIG. 6). The destination server 800 may determine whether the load process was initiated as part of an automated batch mode processing or based on a developer input.

Determination of whether the load process was initiated as part of an automated batch mode processing or based on a developer input may be based on a job account used to initiate the load process 804 (and/or copy feed files to a source folder at the destination server 800). Script/applications used may differ based on this determination. At step 820, the destination server 800 may determine a job account used to initiate the load process 804. If the job account is a developer account, the destination server 800 may determine that the load process 804 was initiated based on developer input. If the load process was initiated based on developer input, the destination server 800 may use developer defined scripts 824 (e.g., scripts stored in a folder associated with the developer). If the job account is a service account, the destination server 800 may determine that the load process 804 was initiated as part of an automated batch mode processing. If the load process was initiated as part of automated batch processing, the destination server may use source server equivalent scripts 828 (e.g., scripts that correspond to scripts used at the source server).

The destination server 800 may be configured with a key columns file 832 that may be used for loading a feed file to the destination server databases 816. The key columns file 832 may indicate specific columns of the feed file that may be loaded to the destination server databases 816. The load process 804 may load the indicated column(s) of the feed file and refrain from loading other columns of the feed file. The key columns file 832 may be configured by a user associated with the enterprise user computing device 130. For example, if the load process 804 is loading the feed file A (as described with reference to FIG. 4B), the key columns file 832 may indicate the columns "membership number" and "subscription category." The load process 804 may accordingly load the "membership number" and "subscription category" columns to the destination server databases 8116 and refrain from loading the "member name" column.

Destination folder 836 associated with the destination server 800 may comprise loaded feed files 836-1 (e.g., loaded based on the load process 804) and rejected feed files 836-2, in accordance with the various procedures described previously.

Figure 9:
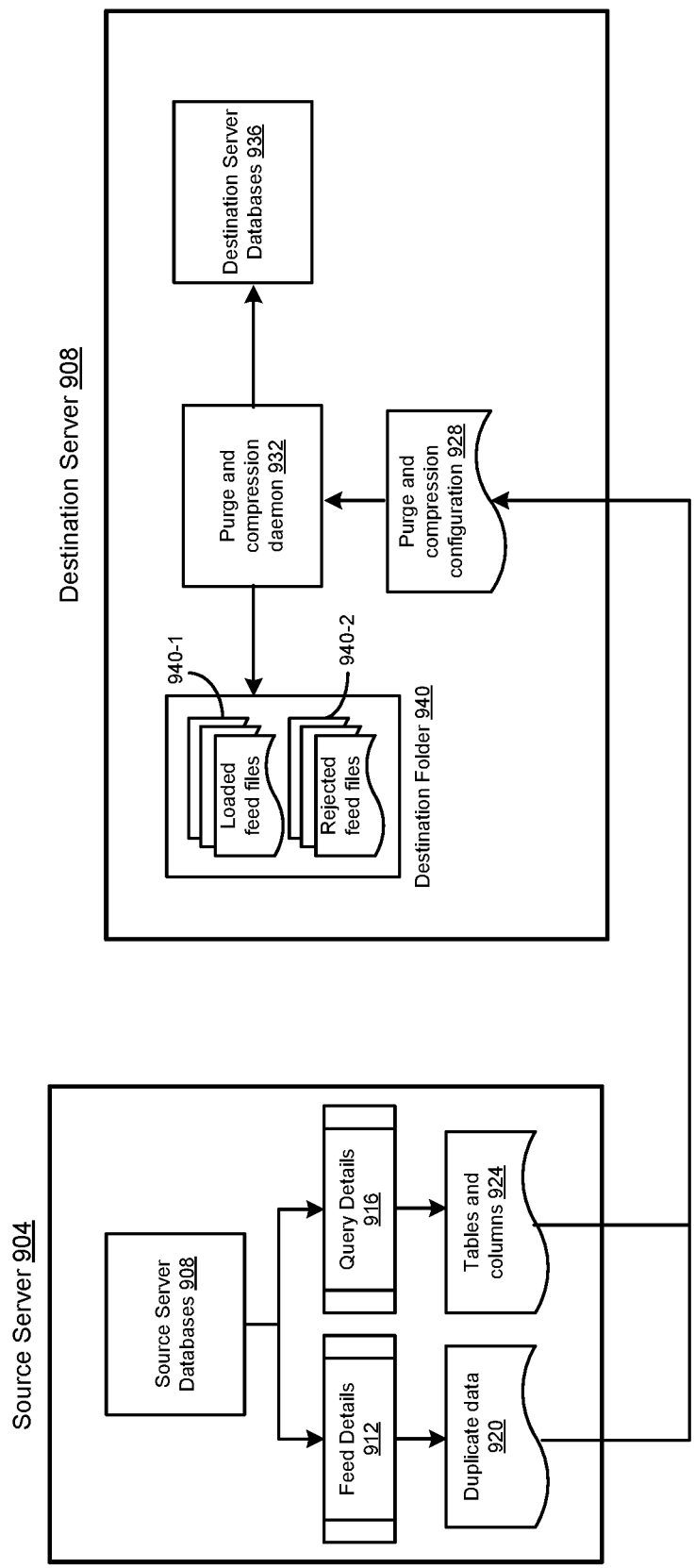
FIG. 9 shows an example operation of a purge and compression daemon as used in a destination server, in accordance with one or more example arrangements.

FIG. 9 shows an example operation of a purge and compression daemon as used in a destination server. Source server 904 and destination server 908 may correspond to source servers and destination servers as described with reference to FIGS. 3A, 3B, 5, and 6. For example, the source server 904 may be a production server and the destination server 908 may be a development server or another production server. As described with reference to FIG. 5, feed files loaded in the source server 904 may also be loaded to the destination server 908. A purge and compression daemon 928 may be used to reduce the size of destination server databases at the destination server 908. This may be especially advantageous where the destination server 908 is a development server with a limited memory capacity.

A query details subroutine 916 may determine query history related to data stored in the source server databases 908. Queries for data may correspond to requests to read or modify the data. Based on the determined query history, the query details subroutine 916 may generate a tables and columns file 924 indicating query history related to tables and columns of tables as stored in the source server databases 908. The tables and columns file 924 may indicate a quantity of times a particular table/column was queried, a frequency of queries for a particular table/column, a number of users querying a particular table/column, etc. In other examples, the tables and columns file 924 may indicate specific table/columns that are being queried and corresponding information associated with the queries (e.g., quantities of times that queries were made, frequency of queries, numbers of user querying, etc.). The tables and columns file 924 may correspond to a particular measurement time interval. For example, the tables and columns file 924 may indicate query history over the past one week, one week, etc. In other examples, the query details subroutine 924 may query history corresponding to any historical time interval.

Multiple tables stored in databases may comprise duplicated information. For example, a table A loaded to the destination server databases 936 may comprise columns that are also present in a table B. In that scenario, the table A (or columns in table A that are duplicates of columns in table B may be deleted). The feed details subroutine 912 may determine duplicated data present in different tables and generate a duplicate data file 920 indicating tables and/or columns in tables that is a duplicate of data present in other tables.

The destination server 908 may generate a purge and compression configuration 928 based on one or more of the duplicate data file 920 and the tables and columns file 924. The purge and compression configuration 928 may indicate tables and/or columns that are to be purged (e.g., deleted) or compressed in the destination server databases 936. For example, if the tables and columns file 924 indicates that a table or column has been queried at the source server 904 during the measurement time interval, the purge and compression configuration 928 may indicate that the table and column is to be retained in the destination server databases 936. The purge and compression configuration 928 may further indicate a period of time for which a table and/or column is to be retained. The period of time may be proportional to a frequency of queries, a number of queries, and/or a number of users querying. For example, purge and compression configuration 928 may indicate that data that is more frequently queried, has a greater number of queries, or has a greater number of users querying be retained for a longer period of time. If the tables and columns file 924 indicates that a table or column has not been recently queried at the source server 904, the purge and compression configuration 928 may indicate that the table or column is to be purged from the destination server databases 936.

The destination server 908 may determine whether a particular table or column is to be compressed based on query activity associated with the table or column at the source server databases 908. For example, if the table or column has only been read during the measurement time interval, the purge and compression configuration 928 may indicate that the table or column is to be compressed at the destination server databases 936. If the table or column has been modified during the measurement time interval, the purge and compression configuration 928 may indicate that the table or column is to not be compressed. The destination server 908 may further determine whether a table or column is to be compressed or retained in its original form based on the frequency of reads and/or modifications at the source server databases 908. The purge and compression daemon 932 may purge, compress, and/or retain tables or columns based on indications in the purge and compression configuration 936.

Figure 10A:
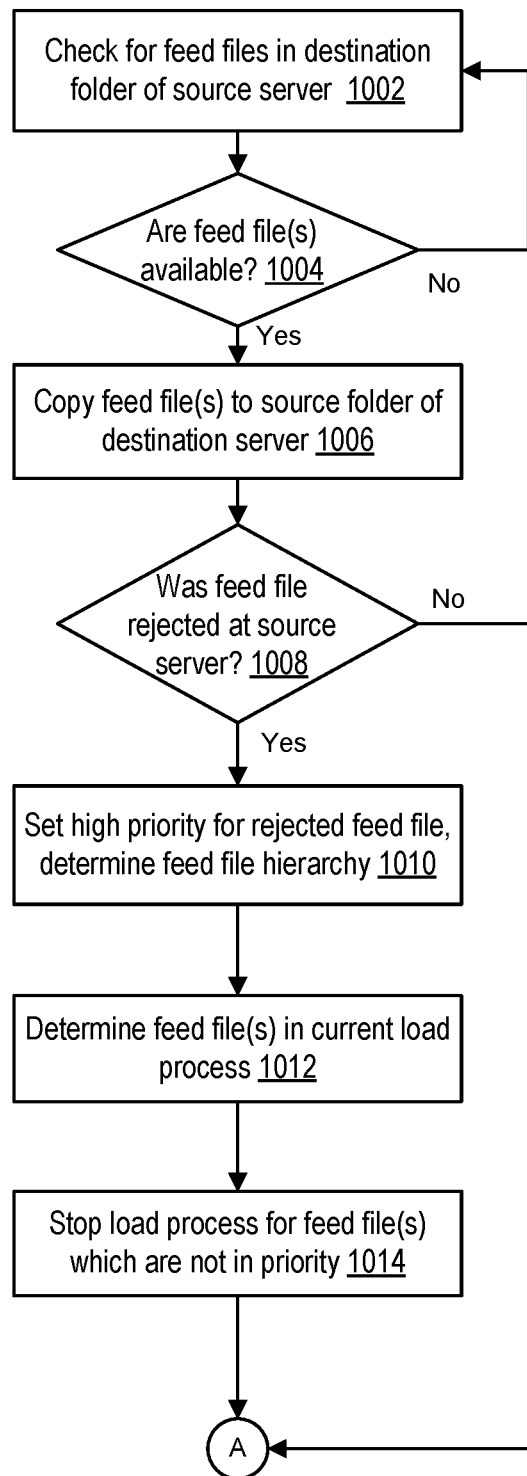
FIGS. 10A and 10B show an example algorithm for data migration, synchronization, and correction, in accordance with one or more example arrangements.
Figure 10B:
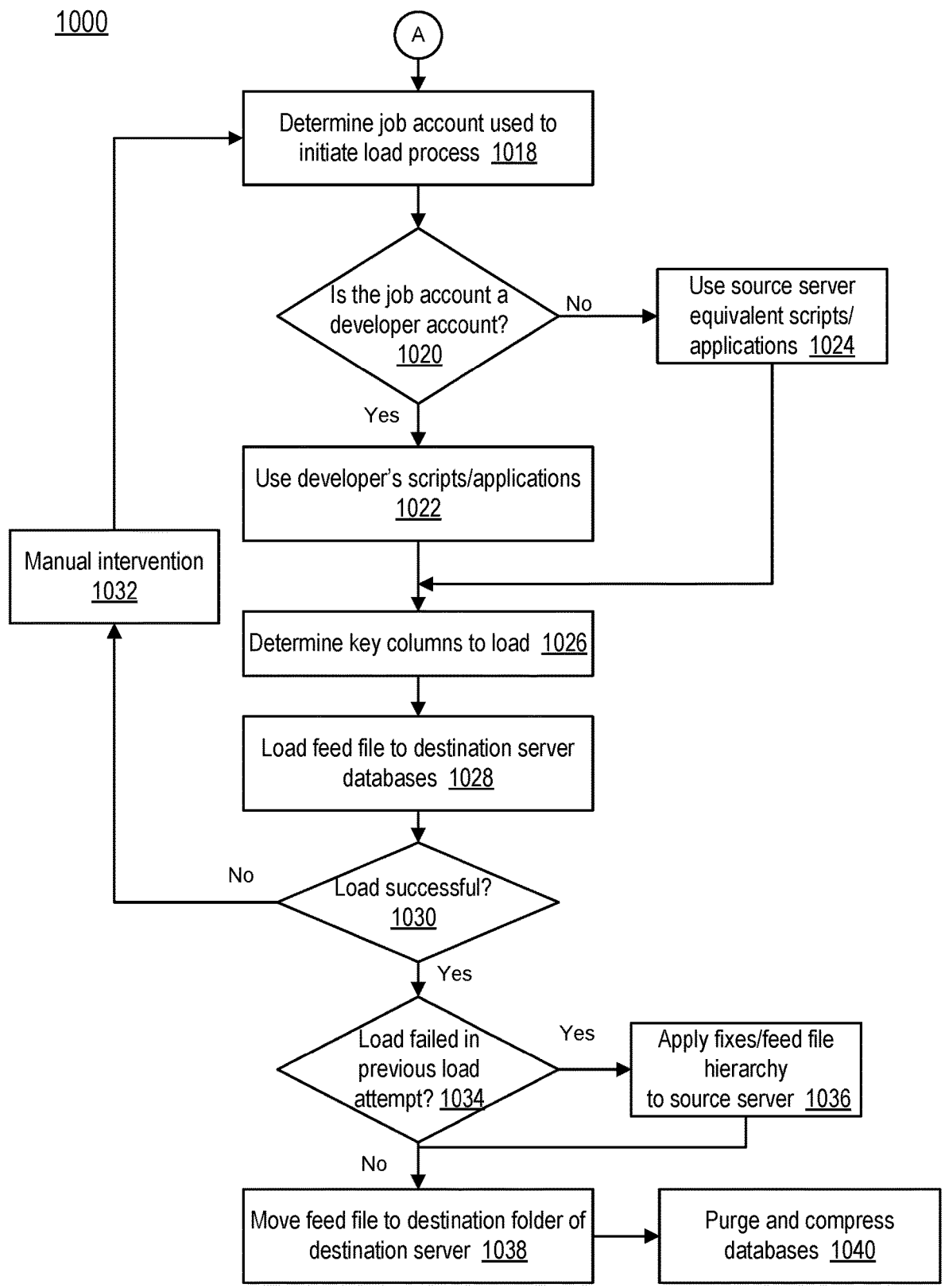

FIGS. 10A and 10B show an example algorithm 1000 for data migration, synchronization, and correction, in accordance with one or more example arrangements. The example algorithm may be performed at a destination server configured by a network database application (e.g., an RDBMS). The example algorithm may be based on instructions stored at the database management platform 110, the database server(s) 120, and/or any other device in the private network 135.

At step 1002, a file watcher daemon associated with the destination server may check for presence of feed files in a destination folder of a source server. At step 1006 and if feed file(s) are present in the destination folder of the source server, file watcher daemon may copy the feed file(s) to the source folder of the destination server.

At step 1008, the file watcher daemon may determine (e.g., based on a load status file as described with reference to FIG. 8) whether a feed file was rejected from loading at source server databases. At step 1010, the file watcher daemon may set high priority to a feed file if the feed file was rejected from loading at source server databases. At step 1012, destination server may determine any feed file(s) that are in a current load process at the destination server. At step 1014, the destination server may stop/abort loading feed file(s) that are in a current load process and are not set to high priority.

A load process may be initiated to load a feed file, in the source folder of the destination server, to destination server databases. The feed file may be a feed file that is set to high priority at step 1010. At step 1018, the destination server may determine a job account used to initiate the load process. At step 1020, the destination server may determine whether the job account is a developer account. At step 1022, the destination server may use developer's scripts/applications for the load process if the job account is determined to be a developer account. At step 1024, the destination server may use scripts/applications, equivalent to those used at the source server, for the load process if the job account is determined to be a service account. At step 1026, the destination server may determine key columns to load in the feed file (e.g., based on indications in a key columns file as described with reference to FIG. 8)

At step 1028, the destination server may load the feed file to the destination server databases using the load process. The feed file may be a feed file that is set to high priority by the file watcher daemon at step 1010. Loading the feed file may comprise loading a parent feed file corresponding to the feed file prior to loading the feed file (e.g., based on a determined feed file hierarchy as described with reference to FIG. 5). Loading the feed file may comprise loading key columns of the feed file as determined at step 1026.

At step 1030, the destination server may determine if the loading of the feed file to the destination server databases was successful (e.g., feed file was not rejected at the destination server databases). At step 1032, the enterprise user computing device 130 may be used for manual intervention if the feed file is not successfully loaded. For example, the enterprise user computing device 130 may be used to fix any errors (e.g., formatting errors) in the feed file. The load process may be attempted again after the manual intervention.

At step 1034, the destination server may determine whether the load process had failed in a previous load attempt at step 1028 and/or if the feed file was initially rejected at the source server databases. The algorithm may move to step 1036 if the load process had failed in a previous load attempt at step 1028 and/or if the feed file was initially rejected at the source server databases. At step 1036, the destination server may apply the fixes (e.g., based on manual intervention) and/or the determined feed file hierarchy to the source server. The source server may load the rejected feed file to the source server databases based on the determined feed file hierarchy and/or edit the feed files based on the manual intervention at step 1032.

At step 1038, the destination server may move the feed file to a destination folder of the destination server. At step 1040, the destination server may purge and/or compress data loaded to the destination server databases based on one or more considerations described with reference to FIG. 9.

Various examples described herein enable efficient operations on databases stored in servers of an enterprise system. Databases in a first server may be synchronized with a second server which may have lower resources than the first server. Various algorithms may be used to correct data in a production server leveraging the flexibility provided by a development server. Further, migration of data may be facilitated in an incremental manner reducing various operations costs associated with database migration.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform for migrating databases between a source server and a destination server, the computing platform comprising:
   at least one processor;
   a communication interface communicatively coupled to the at least one processor; and
   a memory storing computer-readable instructions that, when executed by the at least one processor, cause the computing platform to:
      configure the source server with a first source folder and a first destination folder;
      configure the destination server with a second source folder and a second destination folder;
      receive a plurality of feed files at the first source folder;
      load the plurality of feed files at the first source folder to a database associated with the source server;
      move the plurality of feed files to the first destination folder;
      copy a feed the, of the plurality of feed files, to the second source folder;
      load the feed file to a database associated with the destination server;
      determine one or more first performance statistics associated with the feed file at the destination server; and
      send an indication of the one or more first performance statistics to a user computing device.

2. The computing platform of claim 1, wherein the computer-readable instructions, when executed by the at least one processor, cause the computing platform to:
   determine one or more second performance statistics associated with the feed file at the source server; and
   send an indication of the one or more second performance statistics to a user computing device.

3. The computing platform of claim 1, wherein the one or more first performance statistics comprise one or more of:
   memory resources required for the feed file loaded at the destination server; or
   a latency associated with the feed file loaded at the destination server.

4. The computing platform of claim 1, wherein the computer-readable instructions, when executed by the at least one processor, cause the computing platform to:
   after loading the feed file to the database associated with the destination server, copy a second feed file, of the plurality of feed files, to the second source folder; and
   load the second feed file to the database associated with the destination server.

5. The computing platform of claim 4, wherein:
the loading the feed file to the database associated with the destination server is based on receiving a first instruction from the user computing device; and
the loading the second feed file to the database associated with the destination server is based on receiving a second instruction from the user computing device.

6. The computing platform of claim 1, wherein the source server and the destination server are associated with different relational database management systems (RDBMSs).

7. The computing platform of claim 1, wherein the source server and the destination server are associated with different versions of a same relational database management system (RDBMS).

8. The computing platform of claim 1, wherein the computer-readable instructions, when executed by the at least one processor, cause the computing platform to:
determine a job account used to copy the feed file to the second source folder;
determine one or more scripts based on the job account; and
load the feed file to the database associated with the destination server by causing loading the feed file based on the one or more scripts.

9. The computing platform of claim 8, wherein the one or more scripts are associated with an individual user if the job account is an account associated with the individual user.

10. The computing platform of claim 8, wherein the one or more scripts are associated with the source server if the job account is a service account.

11. The computing platform of claim 8, wherein the one or more scripts indicate a table in the database associated with the destination server to which the feed file is loaded.

12. The computing platform of claim 1, wherein the feed file is associated with a key columns file indicating one or more columns of the feed file, wherein the computer-readable instructions, when executed by the at least one processor, cause the computing platform to load the feed file to the database associated with the destination server by causing loading the one or more columns of the feed file and not loading other columns of the feed file.

13. A method for migrating databases between a source server and a destination server, the method comprising:
configuring the source server with a first source folder and a first destination folder;
configuring the destination server with a second source folder and a second destination folder;
receiving a plurality of feed files at the first source folder;
loading the plurality of feed files at the first source folder to a database associated with the source server;
moving the plurality of feed files to the first destination folder;
copying a feed file, of the plurality of feed files, to the second source folder;
loading the feed file to a database associated with the destination server;
determining one or more first performance statistics associated with the feed file at the destination server; and
sending an indication of the one or more first performance statistics to a user computing device.

14. The method of claim 13, further comprising:
determining one or more second performance statistics associated with the feed file at the source server; and
sending an indication of the one or more second performance statistics to a user computing device.

15. The method of claim 13, wherein the one or more first performance statistics comprise one or more of:
memory resources required for the feed file loaded at the destination server; or
a latency associated with the feed file loaded at the destination server.

16. The method of claim 13, further comprising:
after loading the feed file to the database associated with the destination server, copying a second feed file, of the plurality of feed files, to the second source folder; and
loading the second feed file to the database associated with the destination server.

17. The method of claim 16, wherein:
the loading the feed file to the database associated with the destination server is based on receiving a first instruction from the user computing device; and
the loading the second feed file to the database associated with the destination server is based on receiving a second instruction from the user computing device.

18. The method of claim 13, wherein the source server and the destination server are associated with different relational database management systems (RDBMSs).

19. The method of claim 13, wherein the source server and the destination server are associated with different versions of a same relational database management system (RDBMS).

20. A non-transitory computer readable medium storing computer executable instructions that, when executed by a processor, cause:
configuring a source server with a first source folder and a first destination folder;
configuring a destination server with a second source folder and a second destination folder;
receiving a plurality of feed files at the first source folder;
loading the plurality of feed files at the first source folder to a database associated with the source server;
moving the plurality of feed files to the first destination folder;
copying a feed file, of the plurality of feed files, to the second source folder;
loading the feed file to a database associated with the destination server;
determining one or more first performance statistics associated with the feed file at the destination server; and
sending an indication of the first performance statistics to a user computing device.

* * * * *

UNITED STATES PATENT AND TRADEMARK OFFICE
CERTIFICATE OF CORRECTION

PATENT NO. : 11,379,440 B1
APPLICATION NO. : 17/149331
DATED : July 5, 2022
INVENTOR(S) : Thakkalapelli et al.

Page 1 of 1

It is certified that error appears in the above-identified patent and that said Letters Patent is hereby corrected as shown below:

In the Claims

Column 22, Claim 1, Line 39:
Delete "the," and insert --file,-- therefor

Signed and Sealed this
Sixteenth Day of May, 2023

Katherine Kelly Vidal
*Director of the United States Patent and Trademark Office*